(12) United States Patent
Kogetsu et al.

(10) Patent No.: US 8,182,945 B2
(45) Date of Patent: May 22, 2012

(54) CURRENT COLLECTOR COMPRISING PLURALITY OF PROJECTIONS, ELECTRODE, AND NON-AQUEOUS ELECTROLYTE SECONDARY BATTERY COMPRISING THE SAME

(75) Inventors: Yasutaka Kogetsu, Osaka (JP); Tatsuki Hiraoka, Osaka (JP); Takuhiro Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 650 days.

(21) Appl. No.: 12/167,600

(22) Filed: Jul. 3, 2008

(65) Prior Publication Data

US 2009/0017377 A1    Jan. 15, 2009

(30) Foreign Application Priority Data

Jul. 9, 2007  (JP) .................................. 2007-179967

(51) Int. Cl.
*H01M 4/64* (2006.01)
*H01M 4/02* (2006.01)

(52) U.S. Cl. ........ 429/233; 429/239; 429/243; 429/245; 429/209

(58) Field of Classification Search .................. 429/209, 429/233, 241, 239, 240, 244, 245, 242, 243; 204/280, 283, 286.1, 297.01
See application file for complete search history.

(56) References Cited

U.S. PATENT DOCUMENTS 5,949,637 A * 9/1999 Iwaida et al. ................. 361/502
2005/0064291 A1 * 3/2005 Sato et al. ..................... 429/233

FOREIGN PATENT DOCUMENTS

JP  09-134726  * 5/1997
JP  3733065     10/2005

* cited by examiner

*Primary Examiner* — Raymond Alejandro
(74) *Attorney, Agent, or Firm* — McDermott Will & Emery LLP (57) ABSTRACT

A current collector includes a substrate, a plurality of projections formed on a first portion of the substrate, and at least two adjacent minute projections formed on a second portion of the substrate. The substrate is a metal sheet. The first and second portions are formed on the surface of the substrate. The second portion includes 2 to 100 of minute projections. The minute projections have a height of below 35% of the average height of the plurality of projections. By forming an electrode active material layer on the face of the current collector where the plurality of projections are formed to make an electrode, the detachment of the electrode active material layer, and the spread of the detachment are significantly curbed.

11 Claims, 5 Drawing Sheets

CURRENT COLLECTOR COMPRISING PLURALITY OF PROJECTIONS, ELECTRODE, AND NON-AQUEOUS ELECTROLYTE SECONDARY BATTERY COMPRISING THE SAME

FIELD OF THE INVENTION

The present invention relates to current collectors, electrodes, and non-aqueous electrolyte secondary batteries. Further particularly, the present invention relates to an improvement in current collectors.

BACKGROUND OF THE INVENTION

With recent significant popularity in portable electronic devices (in the following, simply called "electronic devices") such as personal computers, mobile phones, and mobile devices, a demand for batteries for a power source of electronic devices has been increasing significantly. The batteries used in electronic devices are required to be used at room temperature, and also required to have a high battery capacity, a high energy density, and excellent charge and discharge cycle characteristics. Lithium ion secondary batteries are known as an example of such a battery.

Lithium ion secondary batteries include a positive electrode containing a positive electrode active material capable of reversibly absorbing and desorbing lithium ions, a negative electrode containing a negative electrode active material capable of absorbing and desorbing lithium ions, and an electrolyte with lithium ion conductivity. Currently, lithium ion secondary batteries have high-level battery capacity, energy density, and charge and discharge cycle characteristics, and are widely used for a power source of electronic devices. However, in order to achieve further multi-purpose electronic devices, a further high capacity lithium ion secondary battery is demanded.

To achieve a high capacity lithium ion secondary battery, for example, there have been proposed using a silicon compound or a tin compound as the negative electrode active material. The silicon compound includes silicon, silicon oxides, and silicon-containing alloys. The tin compound includes tin, tin oxides, and tin-containing alloys. Since the silicon compound and the tin compound have a very high capacity, by using these compounds, high capacity batteries can be manufactured.

Silicon compounds and tin compounds characteristically expand and contract due to changes in the crystal structure when absorbing and desorbing lithium. Therefore, when a negative electrode includes a negative electrode active material layer containing a silicon compound or a tin compound provided on the negative electrode current collector surface, the negative electrode active material layer expands and contracts during charge and discharge. Along with the expansion and contraction, stress is generated at the interface between the negative electrode current collector and the negative electrode active material layer, which declines the adhesion between the negative electrode current collector and the negative electrode active material layer, causing the negative electrode active material layer to partially detach from the negative electrode current collector. Such a partial detachment spreads to other portions in due course. As the detached portion of the negative electrode active material layer from the negative electrode current collector increases, current collecting performance declines, thereby shortening charge and discharge cycle life.

To solve such problems, Japanese Patent Publication No. 3733065 has proposed a negative electrode for lithium batteries, including a rough-surfaced negative electrode current collector, and an amorphous silicon thin film (negative electrode active material layer). The amorphous silicon thin film is formed at the rough surface of the negative electrode current collector.

The greatest characteristic of this negative electrode is that the amorphous silicon thin film is used as the negative electrode active material layer. In the amorphous silicon thin film, cuts (voids) which extend in the thickness direction thereof are regularly formed, owing to the expansion and contraction during charge and discharge. The amorphous silicon thin film is separated into a plurality of separately independent columns by the cuts, thereby forming an aggregation of the columns. The above-mentioned Japanese Patent Publication further states that the stress generated with the expansion and contraction of respective columns is eased by the cuts, which prevents the detachment of respective columns.

However, because of a relatively large stress generated at the time of forming the cuts, detachment easily occurs at the end portion of the columns adjacent to the cuts. The detachment at the column end portion unavoidably spreads gradually to other portions, even under a state where the stress of expansion and contraction is eased by the cuts.

Even without the occurrence of the detachment at the column end portion, the stress generated at the time of expansion and contraction with charge and discharge is concentrated at the interface between the columns and the negative electrode current collector at the center portion of the columns, and therefore partial detachment of the columns from the negative electrode current collector, and deformation of the negative electrode current collector cannot be avoided.

Therefore, with the technique of the above-mentioned Japanese Patent Publication, detachment of the negative electrode active material layer cannot be sufficiently and reliably prevented. Also, in the technique of the above-mentioned Japanese Patent Publication, the negative electrode active material is limited to a material in which cuts can be formed by charge and discharge, and therefore the negative electrode active material that can be used is limited. Further, the Japanese Patent Publication does not mention at all about techniques to prevent the spread of the detachment, when the negative electrode active material layer is partially detached from the negative electrode current collector.

BRIEF SUMMARY OF THE INVENTION

The present invention aims to provide a current collector with significantly less detachment of the electrode active material layer and spread of the detachment, when a high capacity electrode active material layer is formed on the current collector surface.

The present invention further aims to provide an electrode capable of keeping high-level current collecting performance for a long period of time.

The present invention still further aims to provide a non-aqueous electrolyte secondary battery that has high battery capacity and energy density, excellent charge and discharge cycle characteristics, and that is capable of keeping a high-output stably for a long period of time.

The present invention provides a current collector including a substrate, a plurality of projections, and a chipped portion. The substrate is a metal-made sheet. The plurality of projections are formed at least one face of the substrate. The chipped portion is present at the face of the substrate on which the projections are formed, and includes two or more adjacent minute projections. The minute projections have a height that is below 35% of the average height of the projections.

In a current collector of the present invention, the number of the chipped portions present per cm$^2$ of the face of the substrate on which the projections are formed is preferably 1 to 1000.

In the current collector of the present invention, the chipped portion preferably includes 2 to 100 adjacent minute projections.

In the current collector of the present invention, the average height of the projections is preferably 3 to 10 μm.

In the current collector of the present invention, the tip of the projection preferably is substantially flat.

In the current collector of the present invention, the shape of the projection viewed from above along the vertical direction is preferably polygon, circle, diamond or oval.

In the current collector of the present invention, one or more bumps are preferably provided at the surface of the projections.

The present invention also provides an electrode including the current collector of the present invention and an electrode active material layer containing an electrode active material.

In the electrode of the present invention, the electrode active material layer preferably includes a plurality of columns, and the plurality of columns preferably extend from the surface of the projection to the outside of the projection and are preferably provided so as to be separated from each other.

In the electrode of the present invention, the column preferably includes a stack of chunks containing the electrode active material.

In the electrode of the present invention, the column preferably extends in the direction perpendicular to the current collector surface, or in a direction that forms an angle with the direction perpendicular to the current collector surface.

In the electrode of the present invention, the electrode active material preferably expands and contracts due to charge and discharge.

In the electrode of the present invention, the electrode active material which expands and contracts due to charge and discharge is preferably at least one negative electrode active material selected from the group consisting of silicon, a silicon compound, tin, and a tin compound.

Also, the present invention includes a non-aqueous electrolyte secondary battery including the electrode of the present invention, a counter electrode, i.e., an electrode having a polarity different from the electrode of the present invention, a separator, and a non-aqueous electrolyte.

The non-aqueous electrolyte secondary battery of the present invention is preferably a lithium ion secondary battery.

The current collector of the present invention is characterized in that a chipped portion is present, i.e., two or more adjacent minute projections are present at the face of the current collector on which the plurality of projections are formed, and the height of the minute projections is below 35% of the average height of the projections. In this way, in the case when an electrode active material layer containing an electrode active material that expands and contracts due to charge and discharge is formed on the surface of the projections of the current collector of the present invention, the stress generated with expansion and contraction of the electrode active material layer is significantly eased. As a result, the electrode active material layer can be prevented from partial detachment from the projection surface and the spread of the detachment can be prevented.

In the electrode of the present invention, since an electrode active material layer is formed on the surface of the current collector of the present invention, the battery capacity and other various properties can be kept as almost the same state as the initial state for a long period of time, current collecting performance is excellent, and a contribution can be made to achieve a high capacity battery.

Since the non-aqueous electrolyte secondary battery of the present invention includes the electrode of the present invention, battery capacity and energy density are high, charge and discharge cycle characteristics are excellent, durable life is long, and a high output can be kept stably for a long period of time.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
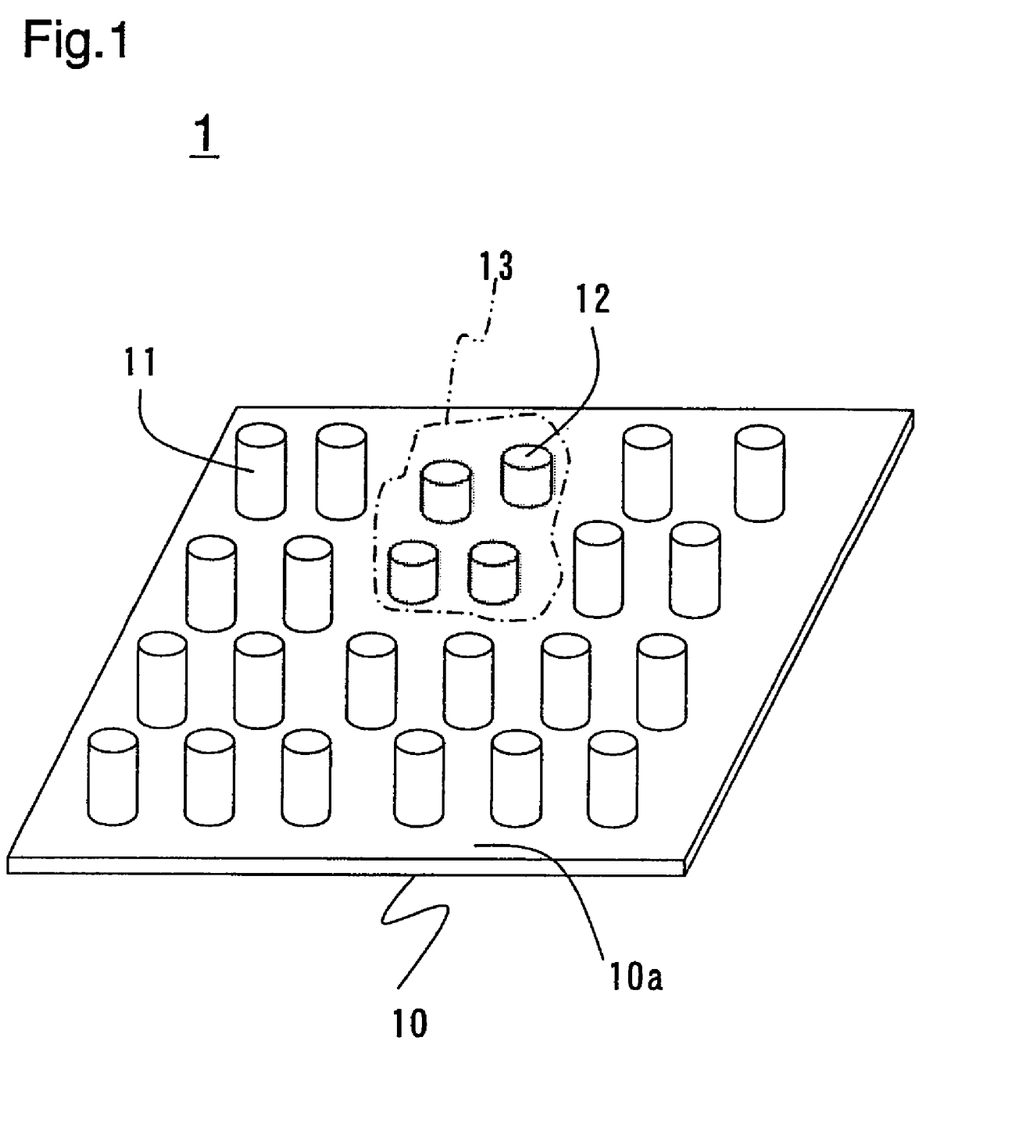
FIG. 1 is a perspective view schematically illustrating a configuration of a current collector of the present invention.

[Current Collector]
FIG. 1 is a perspective view schematically illustrating a configuration of a current collector 1 in one embodiment of the present invention.

The current collector 1 includes a substrate 10, projections 11, and a chipped portion 13. The substrate 10 is a metal-made sheet, and an electrode active material layer, not shown, is formed on one face 10a in the thickness direction thereof. The current collector 1 is characterized in that a plurality of projections 11 are formed on the face 10a, and one or more chipped portions 13 are present.

The chipped portion 13 eases the stress generated with the electrode active material layer expansion, and prevents the detachment of the electrode active material layer and the spread of the detachment. The presence of the chipped portion 13 does not substantially affect the capacity or other properties of a resulting battery, and the battery practically has the same properties as the one that does not include the chipped portion 13. Although the projections 11 are formed on one face 10a in the thickness direction of the substrate 10 in the current collector 1, the projections 11 may be formed on both sides, without limitation.

The substrate 10 is, to be specific, a metal sheet. The metal includes, in the case when the current collector 1 is used as the negative electrode current collector, for example, stainless steel, nickel, copper, and copper alloys. When the current collector 1 is used as the positive electrode current collector, the metal includes, for example, stainless steel, titanium, aluminum, aluminum alloys, and nickel. The substrate 10 is, to be specific, foil or film. The thickness of the substrate 10 is preferably 1 to 50 µm, further preferably 10 to 40 µm, and particularly preferably 10 to 30 µm, without limitation.

Also, instead of the metal sheet, a sheet made of for example a conductive resin or a conductive resin composition may be used. This sheet may be used for any of a positive electrode current collector and a negative electrode current collector. The conductive resin composition is a composition in which conductive powder is dispersed in a synthetic resin. The thickness of this sheet is also about the same as the thickness of the substrate 10.

The projections 11 are protrusions provided so as to extend from the face 10a of the substrate 10 in the thickness direction thereof (in the following, simply called "face 10a") to the outside of the substrate 10. The height of the projection 11 is a length from the face 10a to the tip end portion of the projection 11, in a direction perpendicular to the face 10a. The average height of the projections 11 is preferably about 3 to 10 µm.

The diameter of a cross section of the projection 11 in a direction parallel to the face 10a (in the following, referred to as "cross-sectional diameter of projection 11") is, for example, 1 to 50 µm without limitation. The average height of the projections 11 can be determined, for example, by observing a cross section of the current collector 1 in the thickness direction of the substrate 10 with a scanning electron microscope (SEM), measuring the height of for example 100 projections 11, and calculating an average from the obtained measurement value. The cross-sectional diameter of the projection 11 can also be measured in the same manner as the height of the projection 11.

The projection 11 has a substantially flat top portion at the tip end portion in the growth direction thereof. The growth direction refers to a direction oriented from the face 10a to the outside of the substrate 10. By providing a flat top portion to the projection 11, the bonding strength between the projections 11 and the electrode active material layer is improved. The flat top portion preferably is substantially parallel to the face 10a. In this way, the bonding strength can be further improved.

The shape of the projection 11 is circular. The shape of the projection 11 refers to a shape of the projection 11 viewed from above along the vertical direction when placing the current collector 1 so as to allow the face opposite to the face 10a of the substrate 10 to coincide with the horizontal plane. The shape of the projection 11 is not limited to circular, and may be for example polygon or oval. The polygon preferably is a triangle to an octangle, in view of manufacturing costs. The polygon may also be a parallelogram, a trapezoid, or a diamond.

The number of the projections 11 in the face 10a is appropriately selected based on the size (for example, height and cross-sectional diameter) of the projection 11, the size of the electrode active material layer provided on the surface of the projection 11, and the type of the electrode active material, without limitation. For example, the number of the projection 11 is about 10000 to 10000000/cm$^2$.

The interval between the projections 11 at the face 10a is appropriately selected based on the size (for example, height and cross-sectional diameter) of the projection 11, the size of the electrode active material layer provided on the surface of the projection 11, and the type of electrode active material, without limitation. For example, the projections 11 are preferably formed such that the distance between the axes of the adjacent projections 11 is about 2 to 100 µm.

Bumps, not shown, may be formed on the surface of the projection 11. In this way, the bonding strength between for example the current collector 1 and the electrode active material layer is further improved. As a result, the detachment of the electrode active material layer from the current collector 1, and the spread of the detachment can be prevented further reliably. The bumps are provided so as to protrude from the surface of the projection 11 to the outside of the projection 11. A plurality of the bumps having a size smaller than the size of the projection 11 may be formed. The bumps may be formed at the side face of the projection 11 so as to extend in the radial direction thereof. The bumps may also be formed at the side face of the projection 11, so as to extend in the growth direction of the projection 11. In the case when the tip end portion of the projection 11 is a flat top portion, a plurality of bumps having a size smaller than the size of the projection 11 may be formed at the top portion, and one or more bumps extending in one direction may be formed.

At the chipped portion 13, a plurality of minute projections 12 are present adjacently. The minute projection 12 is a protrusion having a height that is below 35%, preferably below 25%, of the average height of the projections 11. Even if the plurality of protrusions having a height exceeding 35% of the average height of the projections 11 are adjacently present, the effect of easing the stress is insufficient. The height of the minute projection 12 can be determined by an observation with a scanning electron microscope, in the same manner as the determination of the height of the projection 11.

The number of the minute projections 12 at the chipped portion 13 is two or more, preferably 2 to 100, and further preferably 5 to 80. When the number of the minute projections 12 is one, the effect of easing the stress is insufficient. When the number of the minute projections 12 exceeds 100, the bonding strength between the current collector 1 and the electrode active material layer would be possibly insufficient immediately after the formation of the electrode active material layer. In this embodiment, three minute projections 12 are adjacently present at the chipped portion 13. The size other than the height and the shape of the minute projection 12 may be the same as those of the projections 11, or one or both of the size and the shape may be different from the projections 11.

The number of the chipped portions 13 is preferably 1 to 1000, and further preferably 5 to 800 per cm$^2$ of the face 10a. Even when the number of the chipped portions 13 is one, if, for example, about 50 to 100 of the minute projections 12 are included, it is effective in easing the stress. When the number of the chipped portions exceeds 1000, the bonding strength between the current collector 1 and the electrode active material layer would be possibly insufficient from immediately after the formation of the electrode active material layer.

Therefore, 1 to 1000 chipped portions 13, in which 2 to 100 minute projections 12 are adjacently present, preferably are present per cm$^2$ of the face 10a.

In a non-aqueous electrolyte secondary battery including an electrode including an electrode active material layer provided on the surface of the projections 11 on the current collector 1, at the time of initial charge, sometimes the stress from the expansion of the electrode active material becomes the maximum, which may cause a plastic deformation of the projections 11. However, the projections 11 will not be deformed by the expansion and contraction of the electrode active material that occurs thereafter. This is probably because the paths for ion diffusion are secured at the time of the initial charge, and the configuration of the elements in the electrode active material is optimized, which decreases the stress from expansion and contraction.

The plastic deformation of the projections 11 at the time of the initial charge does not cause the detachment of the whole electrode active material layer from the projections 11. Therefore, the projection 11 can stably hold the electrode active material layer for a long period of time.

The current collector 1 can be made by using a technique for forming uneven surface on a metal sheet such as for example metal foil and metal film. To be specific, for example, a roll in which recess portions corresponding to the shape, size and configurations of the projections 11 and the minute projections 12 are formed on the surface thereof (in the following, referred to as "projection-forming roll") is used.

To be further specific, a projection-forming roll is brought into press-contact with a roll having a smooth surface, so as to allow their axes to be parallel, and a metal sheet, i.e., a plate for a current collector, is allowed to pass through the portion of their press-contact, to carry out pressure-molding. Preferably, at least the surface of the smooth roll is made of an elastic material. In the case where the projections 11 are formed on both faces of the metal sheet, two projection-forming rolls may be brought into press-contact with each other, so as to allow their axes to be parallel, and a metal sheet may be allowed to pass through the portion of the press-contact to carry out pressure-molding. The pressure of the roll's press-contact may be appropriately selected, based on the material and the thickness of the metal sheet, the shape and the size of the projections 11, and the thickness setting of the substrate 10 after pressure-molding.

The projection-forming roll can be made, for example, by forming a first hole (in the following, referred to as "first recess portion") and a second hole (in the following, referred to as "second recess portion") at predetermined positions on the surface of a ceramic roll. The first recess portion corresponds to the shape, size, and configuration of the projections 11. The second recess portion corresponds to the shape, size, and configuration of the minute projections 12. Therefore, the depth of the second recess portion is below 35% of the depth of the first recess portion. By using this projection-forming roll, the current collector 1 can be made.

Further, a third hole with a diameter smaller than that of the first recess portion can be formed at the bottom of the first recess portion. A fourth hole with a diameter smaller than that of the second recess portion can be formed at the bottom of the second recess portion. One or both of the third hole and the fourth hole can be formed.

When the first recess portion and the third hole are both formed as a circular hole, the first recess portion and the third hole are preferably formed so that their axes coincide with each other. When the second recess portion and the fourth hole are both formed as a circular hole, the second recess portion and the fourth hole are preferably formed so that their axes coincide with each other.

By using a projection-forming roll including one or both of the third hole and the fourth hole, a current collector 1 with bumps on one or both of the surface of the projections 11 and the surface of the minute projections 12 can be formed. Even with a projection-forming roll including only the first recess portion, by using a projection-forming roll which has been used many times, with the first recess portion deformed by fatigue, the projections 11 and the minute projections 12 can be formed.

Examples of the ceramic roll used in making the projection-forming roll include those including a core roll and a thermal spray layer. For the core roll, a roll made of for example iron and stainless steel can be used. The thermal spray layer is formed by uniformly thermal spraying a ceramic material such as chromic oxide on the surface of the core roll. The first recess portion and the second recess portion are formed on the thermal spray layer. Further, the third hole and the fourth hole are formed as necessary. For forming these holes, for example, a general laser used for molding and processing a ceramic material can be used.

A different type of projection-forming roll can be used as well. Examples of the different type of projection-forming roll include those including a core roll, a ground layer, and a thermal spray layer. The core roll is a roll including for example iron and stainless steel as mentioned above. The ground layer is formed on the surface of the core roll. On the surface of the ground layer, the first recess portion and the second recess portion corresponding to the projections 11 and the minute projections 12 are formed. For forming the first recess portion and the second recess portion on the ground layer, for example, a resin sheet including recess portions corresponding to the first recess portion and the second recess portion formed on one side thereof may be molded, and the resin sheet may be attached to the core roll surface with the face of the resin sheet opposite to the face where the recess portions are formed wound around the core roll. The resin sheet preferably is made of a synthetic resin with a high mechanical strength. For the synthetic resin, for example, thermosetting resins such as unsaturated polyester, thermosetting polyimide, epoxy resin, and fluorocarbon resin; and thermoplastic resins such as polyamide and polyetheretherketone may be used. The thermal spray layer is formed by thermal spraying a ceramic material such as chromic oxide on the ground layer surface in conformity with the uneven surface on the surface thereof. Therefore, considering the thickness of the thermal spray layer, the recess portions on the ground layer are formed to be larger than the designed size of the first recess portion and the second recess portion, by an amount corresponding to the thickness of the thermal spray layer. Thus, a different type of a projection-forming roll is obtained.

Examples of another different projection-forming roll include those including a core roll and a hard metal layer. The core roll is a roll made of for example iron and stainless steel as mentioned above. The hard metal layer contains, for example, a hard metal such as tungsten carbide. The hard metal layer can be formed, for example, by thermal fitting or cool fitting a hard metal formed into a cylindrical form on the core roll. In the thermal fitting, a cylindrical hard metal is warmed to expand, and fitted onto the core roll. In the cool fitting, the core roll is cooled to shrink, and inserted into the cylindrical hard metal. On the surface of the hard metal layer, the first recess portion and the second recess portion can be directly formed by using laser.

Examples of another projection-forming roll include a hard iron type roll. The hard iron type roll is used, for example, for making metal foil by rolling metal. Examples of the hard iron type roll include a roll made of for example high-speed steel and forged steel. Examples of the high-speed steel include those irons with a metal such as molybdenum, tungsten, and vanadium added and heat-treated to increase hardness. The forged steel is an iron-type material made by heating steel blocks or steel slabs, and molding by forging or rolling and forging, and further heat-treating the steel blocks or steel slabs. The steel blocks are made by casting a molten steel in a mold. The steel slabs are made from the steel blocks. On the surface of the hard iron type roll, the first recess portions and the second recess portions can be directly formed by using laser.

Further, after forming the current collector 1 with the projections 11 and the minute projections 12 by using the above-described projection-forming roll, bumps may be formed on the surface of the projections 11 and the minute projections 12. The bumps can be formed, for example, by plating. That is, bumps are formed so as to protrude from the surface of the projections 11 and the minute projections 12, by soaking the current collector 1 in a plating bath and allowing a current exceeding the limiting current value to pass through for plating.

Although the reasons why the bumps are formed selectively on the surface of the projections 11 and the minute projections 12 by the above-described method are not clear sufficiently, the reasons may be as follows. When a current exceeding the limiting current value is allowed to pass through, metals are deposited mainly at the portions where the current easily flows to. Protrusions such as the projections 11 and the minute projections 12 have a form which easily induces a current concentration. However, the surfaces of the projections 11 and the minute projections 12 include a portion to which a current easily flows relatively, and a portion to which a current hardly flows relatively. At the portion where a current easily flows to, a core metal is deposited, and bumps grow therefrom. Those bumps easily grow in the radial direction of the projection 11 at the side face of the growth direction of the projection 11. The same applies to the minute projections 12 as well.

The current collector 1 can also be made for example by using the photoresist method and the plating method. By using these methods, the projections 11, the minute projections 12, and the bumps on the surfaces of these can be formed simultaneously. To be further specific, for example, the current collector 1 can be made by a method including a process of forming a pattern and a process of plating.

In the pattern-forming process, a resist pattern is formed on the surface of the metal sheet by the photoresist method. In the photoresist method, a resist layer is formed on the metal sheet, and then the resist layer is partially removed by exposure and development to form a pattern.

The resist layer is formed by using a resist material such as a liquid resist and a dry resist film. The resist material may be negative-type or positive-type. The thickness of the resist layer may be set to about 40 to 80%, and preferably to about 40 to 60% of the height of the projections 11.

The exposure may be carried out, for example, with a mask placed on the surface of the resist layer. For the mask, for example, a glass mask or a resin mask with circular or polygon dots printed is used. The diameter of the dots is appropriately selected from the range, for example, of about 1 to 20 μm. The development is carried out after the exposure. The development is carried out by allowing the exposure face to contact with an alkaline solution. After the development, water washing and drying are carried out, thereby forming a resist pattern.

In the plating process, a metal-plating is carried out for the metal sheet with a resist pattern formed on its surface in the pattern-forming process. For example, the metal sheet with a resist pattern formed is soaked in a plating bath to plate the opening of the resist pattern, thereby obtaining the current collector 1.

The metal plating is not particularly limited as long as the plating is carried out by using a metal that does not react with lithium. For example, copper plating, nickel plating, and chromium plating are preferable. Any of the electrolytic plating, the electroless plating, and the chemical plating may be used.

Since the photoresist method and the plating method used herein are the methods that are industrially established and used in various industrial field such as semiconductor field, it is clear that the current collector 1 can be easily manufactured industrially.

The current collector of the present invention is, suitably used for making, for example, an electrode which is made by forming an electrode active material layer including an electrode active material containing silicon or tin on the surface the current collector.

[Electrode]

An electrode of the present invention includes a current collector and an electrode active material layer. The current collector is a current collector of the present invention, and is characterized in that a plurality of projections and minute projections are formed and a chipped portion is included on one or both faces of a substrate, which is a metal sheet. The electrode active material layer contains a positive electrode active material or a negative electrode active material. The electrode of the present invention is preferably used as a negative electrode, in which a negative electrode active material layer is formed on a current collector surface.

When the electrode of the present invention is used as a positive electrode, a positive electrode active material layer is formed on the current collector surface. The positive electrode active material layer may be provided at one side of the current collector, or may be provided at both sides of the current collector. The positive electrode active material layer contains a positive electrode active material, and further may contain a conductive agent and a binder as necessary.

For the positive electrode active material, those used regularly in the art may be used. When a resulting positive electrode is used in a lithium ion secondary battery, for the positive electrode active material, for example, lithium-containing composite metal oxides, chalcogen compounds, and manganese dioxides may be used. Among these, lithium-containing composite metal oxides are preferably used.

A lithium-containing composite metal oxide is a metal oxide containing lithium and a transition metal, or a metal oxide in which the transition metal therein is partially replaced with an element of a different kind. Examples of the different element include Na, Mg, Sc, Y, Mn, Fe, Co, Ni, Cu, Zn, Al, Cr, Pb, Sb, and B, and Mn, Al, Co, Ni, and Mg are preferable. The different element may be used singly, or may be used in combination.

Specific examples of lithium-containing composite metal oxides include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xM_2O_4$, $Li_xMn_{2-y}M_yO_4$, $LiMPO_4$, and $Li_2MPO_4F$ (in each of the formulae, M represents at least one element selected from the group consisting of Na, Mg, Sc, Y, Mn, Fe, Co, Ni, Cu, Zn, Al, Cr, Pb, Sb, V, and B. x=0 to 1.2, y=0 to 0.9, and z=2.0 to 2.3). The value of x representing the molar ratio of lithium increases and decreases by charge and discharge. Examples of the chalcogen compound include titanium disulfide and molybdenum disulfide. One type of positive electrode active material may be used singly, or two or more types of positive electrode active material may be used in combination.

For the conductive agent, those used regularly in the art may be used, including for example, graphites such as natural graphite and artificial graphite; carbon blacks such as acetylene black, ketjen black, channel black, furnace black, lamp black, and thermal black; conductive fibers such as carbon fiber and metal fiber; fluorocarbon; powder of metals such as aluminum; conductive whiskers such as zinc oxide whisker; conductive metal oxides such as titanium oxide; and organic conductive materials such as phenylene derivatives. One type of conductive agent may be used singly, or two or more types of conductive agent may be used in combination as necessary.

For the binder as well, those used regularly in the art may be used, including for example, polyvinylidene fluoride (PVDF), polytetrafluoroethylene (PTFE), polyethylene, polypropylene, aramid resins, polyamide, polyimide, polyamideimide, polyacrylnitrile, polyacrylic acid, polyacrylic acid methylester, polyacrylic acid ethylester, polyacrylic acid hexylester, polymethacrylic acid, polymethacrylic acid methyl ester, polymethacrylic acid ethylester, polymethacrylic acid hexylester, polyacetic acid vinyl, polyvinylpyrrolidone, polyether, polyether sulfone, polyhexafluoropropylene, styrene-butadiene rubber, ethylene-propylenediene copolymer, and carboxymethyl cellulose.

A copolymer of at least two monomer compounds selected from the group consisting of tetrafluoroethylene, hexafluoropropylene, perfluoroalkylvinylether, fluorovinylidene, chlorotrifluoroethylene, ethylene, propylene, pentafluoropropylene, fluoromethylvinylether, acrylic acid, and hexadiene may be used as well. One type of binder may be used singly, or two or more types of binder may be used in combination as necessary.

The positive electrode active material layer can be made, for example, by applying a positive electrode material mixture slurry on one or both sides of the current collector, drying the slurry, and carry out rolling as necessary. The electrode of the present invention functioning as a positive electrode is thus obtained. The positive electrode material mixture slurry contains a positive electrode active material, and as necessary, a conductive agent and a binder. The positive electrode material mixture slurry can be prepared by dissolving or dispersing the positive electrode active material, and as necessary a conductive agent and a binder in an organic solvent. For the organic solvent, those used regularly in the art may be used, including for example, dimethylformamide, dimethylacetamide, methylformamide, N-methyl-2-pyrrolidone (NMP), dimethylamine, acetone, and cyclohexanone. One type of organic solvent may be used singly, or a mixture of two or more types of organic solvents may be used.

The proportion of the positive electrode active material, the conductive agent, and the binder, when these are used together, can be appropriately selected. Preferably, the proportion of the positive electrode active material to be used is 80 to 97 wt % relative to the total amount of the positive electrode active material, the conductive agent, and the binder (in the following, referred to as "solid content"). The proportion of the conductive agent to be used is 1 to 20 wt % of the solid content. The proportion of the binder to be used is 1 to 10 wt % of the solid content. The amounts can be appropriately selected from these ranges, so that the total amount of these three components becomes 100 wt %.

Figure 2:
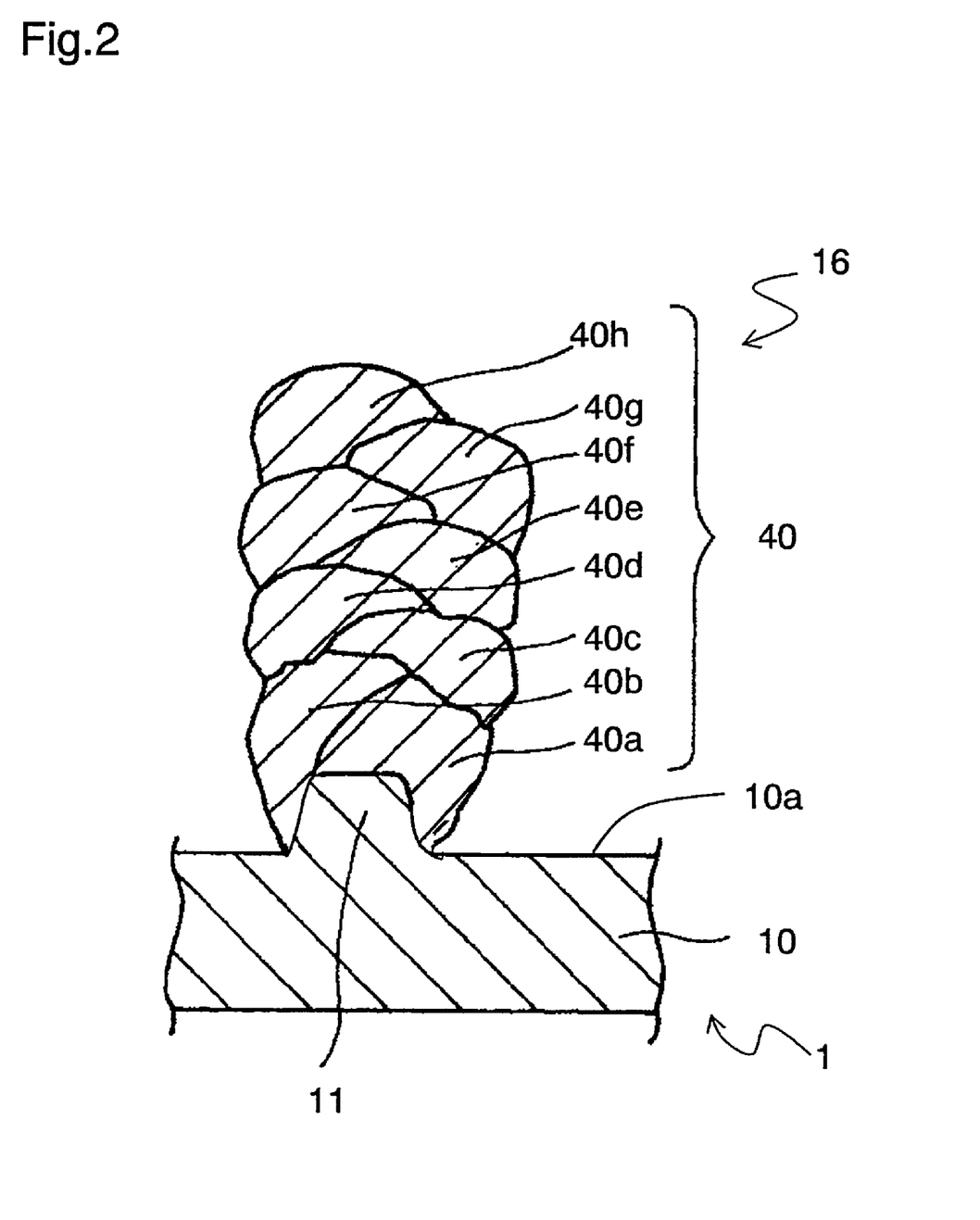
FIG. 2 is a vertical cross sectional view schematically illustrating a configuration of a negative electrode of the present invention.

When the electrode of the present invention is used as a negative electrode, a negative electrode active material layer is formed on the current collector surface. FIG. 2 is a vertical cross sectional view schematically illustrating a configuration of a negative electrode as one embodiment of a negative electrode in the present invention. The negative electrode includes a current collector 1 and a negative electrode active material layer 16.

The negative electrode active material layer 16 includes a plurality of columns 40. The columns 40 contain a negative electrode active material, and are carried by the projections 11 on the surface of the current collector 1. The column 40 extends from at least a portion of the surface of the projection 11 to the outside of the current collector 1, and provided so as to be separate from other columns, not shown. The direction to which the column 40 extends is perpendicular or substantially perpendicular to the face 10a of the current collector 1. The direction to which the column 40 extends may be a direction tilted (making an angle) relative to the direction perpendicular to the face 10a of the current collector 1. In this embodiment, the column 40 is provided on one side of the current collector 1, but the columns may be provided on both sides of the current collector, without limitation.

For the negative electrode active material, those used regularly in the art may be used, including for example, metals, metal fibers, carbon materials, oxides, nitrides, silicon, silicon compounds, tin, tin compounds, and various alloy material. Among these, carbon materials, silicon, silicon compounds, tin, and tin compounds are preferable, considering the magnitude of the capacity density, and silicon, silicon compounds, tin, and tin compounds are further preferable, which are a negative electrode active material capable of repeating expansion and contraction with charge and discharge.

Examples of the carbon material include various natural graphites, coke, partially graphitized carbon, carbon fiber, spherical carbon, various artificial graphites, and amorphous carbon.

Examples of the silicon compound include silicon-containing alloys, silicon-containing inorganic compounds, silicon-containing organic compounds, and solid solutions. Specific examples of the silicon compounds include a silicon oxide represented by $SiO_a$ (0.05<a<1.95); an alloy containing silicon and at least one element selected from the group consisting of Fe, Co, Sb, Bi, Pb, Ni, Cu, Zn, Ge, In, S, and Ti; a silicon compound, or a silicon-containing alloy, in which silicon contained in silicon, silicon oxide or alloy is partially replaced with at least one element selected from the group consisting of B, Mg, Ni, Ti, Mo, Co, Ca, Cr, Cu, Fe, Mn, Nb, Ta, V, W, Zn, C, N, and Sn; and a solid solution of these.

Examples of the tin compound include $SnO_b$ (0<b<2), $SnO_2$, $SnSiO_3$, $Ni_2Sn_4$, and $Mg_2Sn$. One type of negative electrode active material may be used singly, or two or more types of negative electrode active materials may be used in combination as necessary.

As shown in FIG. 2, the negative electrode active material layer 16 is formed as an aggregate of the columns 40. In general cases, the columns 40 easily detaches at its interface with the projections 11, where the distortion by expansion of the negative electrode active material is at its maximum.

However, in the present invention, by providing the chipped portion at the face 10a, where the projections 11 are formed, of the current collector 1, the detachment of the columns 40 is significantly curbed. Also, since the projections 11 can be formed in a very small size, the columns 40 can be made relatively micro-sized. Further, by adjusting the intervals between the projections 11, appropriate gaps between the columns 40 can be given. Therefore, the stress resulting from expansion and contraction is eased, the detachment of the negative electrode active material layer 16 decreases, the deformation of the current collector 1 hardly occurs.

As shown in FIG. 2, the column 40 is further preferably formed as a stack of eight columnar chunks 40a, 40b, 40c, 40d, 40e, 40f, 40g, and 40h. The column 40, which is a stack, can be formed for example as follows. First, the columnar chunk 40a is formed, so as to cover the top portion, and a portion of the side face, connected to the top portion, of the projection 11. Then, the columnar chunk 40b is formed, so as to cover the remaining side face of the projection 11, and a portion of the surface of the top portion of the columnar chunk 40a. That is, in FIG. 2, the columnar chunk 40a is formed on one end portion of the projection 11 that includes the top portion of the projection 11, and the columnar chunk 40b is partially stacked on the columnar chunk 40a but the remaining portion is formed at the other end portion of the projection 11.

Further, the columnar chunk 40c is formed, so as to cover the remaining portion of the surface of the top portion of the columnar chunk 40a, and a portion of the surface of the top portion of the columnar chunk 40b. That is, the columnar chunk 40c is formed mainly to contact with the columnar chunk 40a. Further, the columnar chunk 40d is formed mainly to contact with the columnar chunk 40b. By stacking the columnar chunks 40e, 40f, 40g, and 40h alternately in the same manner, the column 40 is formed.

Figure 3:
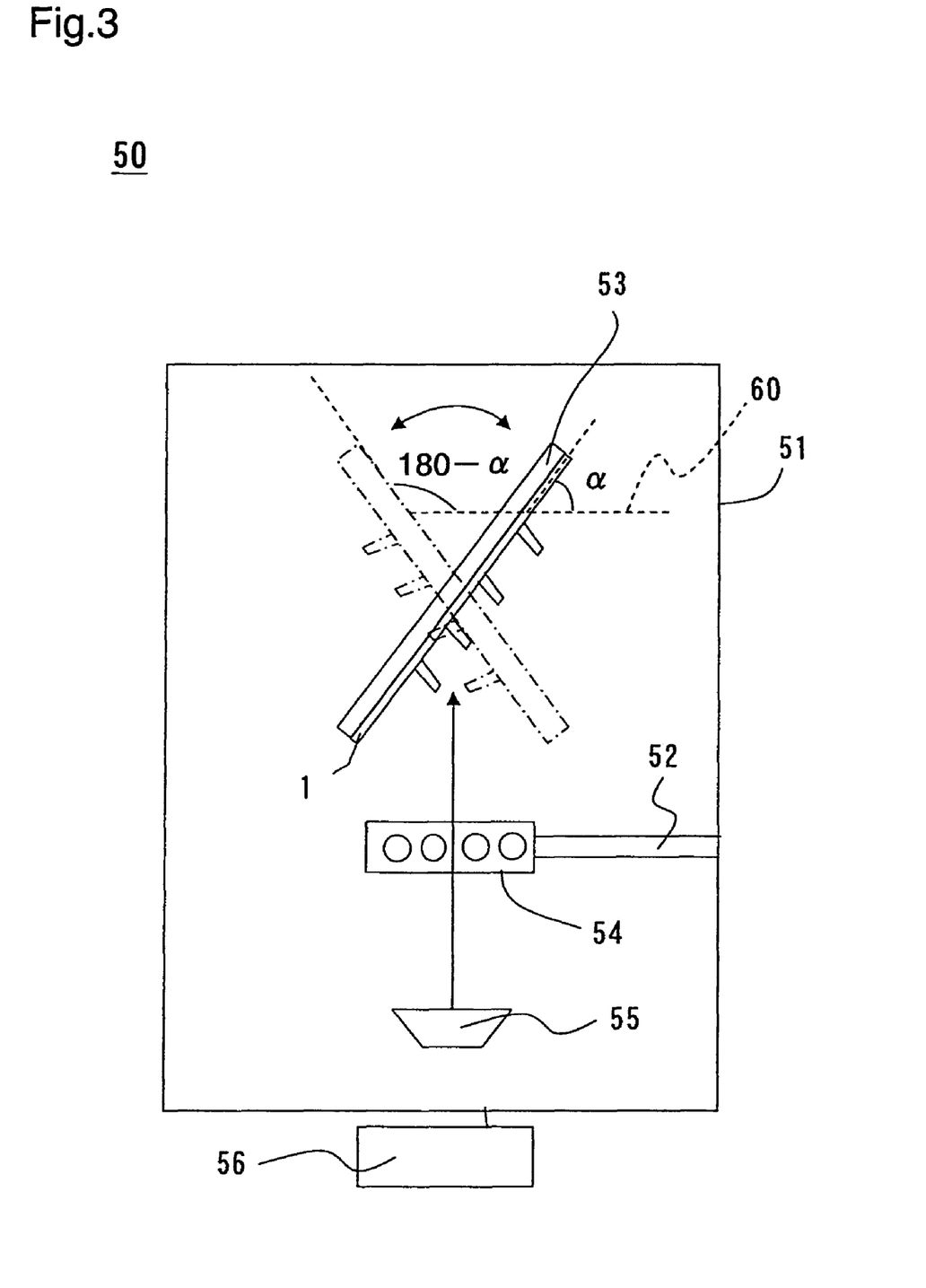
FIG. 3 is a side view schematically illustrating a configuration of an electron beam deposition apparatus.

The column 40 can be formed, for example, by an electron beam deposition apparatus 50 as shown in FIG. 3. FIG. 3 is a side view schematically illustrating a configuration of an electron beam deposition apparatus 50. In FIG. 3, solid lines are used to illustrate the members in the deposition apparatus 50. The deposition apparatus 50 includes a chamber 51, a first pipe 52, a fixing board 53, a nozzle 54, a target 55, an electron beam generating apparatus (not shown), a power source 56, and a second pipe (not shown).

The chamber 51 is a pressure-tight container having an inner space, and contains the first pipe 52, the fixing board 53, the nozzle 54, and the target 55 therein. One end of the first pipe 52 is connected to the nozzle 54. The other end of the first pipe 52 extends to the outside of the chamber 51, and is connected to an oxygen tank (not shown) via a mass flow controller (not shown). The first pipe 52 supplies oxygen to the nozzle 54.

The fixing board 53 is a rotatably supported plate-like member. On one face of the fixing board 53 in the thickness direction thereof, the current collector 1 can be fixed. The fixing board 53 is rotated between the position shown in solid line and the position shown in dot-dash line in FIG. 3. At the position indicated by the solid line, the surface of the fixing board 53 to which the current collector 1 is fixed faces the nozzle 54 located below along the vertical direction. The angle made between the fixing board 53 and the horizontal line 60 is α°. At the position indicated by the dot-dash line, the surface of the fixing board 53 onto which the current collector 1 is fixed faces the nozzle 54 located below along the vertical direction. The angle formed between the fixing board 53 and the horizontal line 60 is (180−α)°. The angle α° can be appropriately selected based on the size of the column 40 to be formed.

The nozzle 54 is provided between the fixing board 53 and the target 55 along the vertical direction, and is connected to one end of the first pipe 52. The nozzle 54 allows vapor of a negative electrode active material or raw materials of the negative electrode active material, which moves upward from the target 55, to be mixed with oxygen supplied from the first pipe 52, and supplies the mixture to the surface of the current collector 1 fixed at the fixing board 53.

The target 55 stores a negative electrode active material or raw materials of the negative electrode active material. The electron beam generating apparatus applies electron beam to the negative electrode active material or the raw materials of the negative electrode active material stored in the target 55 to heat and generates vapor of these. A power source 56 is provided outside the chamber 51, and is electrically connected to the electron beam generating apparatus, to apply a voltage to the electron beam generating apparatus for generating electron beam. The second pipe introduces oxygen gas into the chamber 51. An electron beam deposition apparatus having the same configuration as that of the deposition apparatus 50 is commercially available from, for example, Ulvac Inc.

In the electron beam deposition apparatus 50, first of all, the current collector 1 is fixed to the fixing board 53, and oxygen gas is introduced into the chamber 51. Under such a state, electron beam is applied to the negative electrode active material or the raw materials of the negative electrode active material in the target 55 to heat and generate vapor of them. In this embodiment, silicon is used for the negative electrode active material. The vapor of the negative electrode active material or its raw materials goes up in the vertical direction, and is mixed with oxygen upon passing through in the vicinity of the nozzle 54, and further goes up to be supplied to the surface of the current collector 1 fixed on the fixing board 53.

In this way, a layer including silicon and oxygen is formed on the surface of the projections, which are not shown. At this time, by setting the fixing board 53 to the position indicated by the solid line, the columnar chunk 40a shown in FIG. 2 is formed on the surface of the projection. Then, by rotating the fixing board 53 to the position indicated by the dot-dash line, the columnar chunk 40b shown in FIG. 2 is formed. By rotating the position of the fixing board 53 alternately in this way, the column 40, i.e., a stack of eight columnar chunks 40a, 40b, 40c, 40d, 40e, 40f, 40g, and 40h as shown in FIG. 2, is formed, and the negative electrode is obtained.

When the negative electrode active material is a silicon oxide represented by for example $SiO_a$ (0.05<a<1.95), the column 40 may be formed so as to provide a concentration gradient of oxygen in the thickness direction of the column 40. To be specific, the oxygen content may be made higher in the proximity of the current collector 1, and may be decreased as the distance from the current collector 1 increases. In this way, the bonding strength between the columns 40 and the current collector 1 further improves.

When the negative electrode used in a lithium ion secondary battery, a lithium metal layer may further be formed on the surface of the negative electrode active material layer 16. The amount of the lithium metal may be set to an amount corresponding to the irreversible capacity reserved in the negative electrode active material layer 16 at the time of initial charge and discharge. The lithium metal layer may be formed, for example, by vapor deposition.

The electrode of the present invention is suitably used as an electrode for, for example, lithium ion secondary batteries, especially as a negative electrode.

[Non-Aqueous Electrolyte Secondary Battery]

A non-aqueous electrolyte secondary battery of the present invention includes an electrode of the present invention, a counter electrode, i.e., an electrode having a polarity different from the electrode of the present invention, a separator, and a non-aqueous electrolyte. In the battery of the present invention, one of the positive electrode and the negative electrode may be the electrode of the present invention, or both of the positive electrode and the negative electrode may be the electrode of the present invention.

Figure 4:
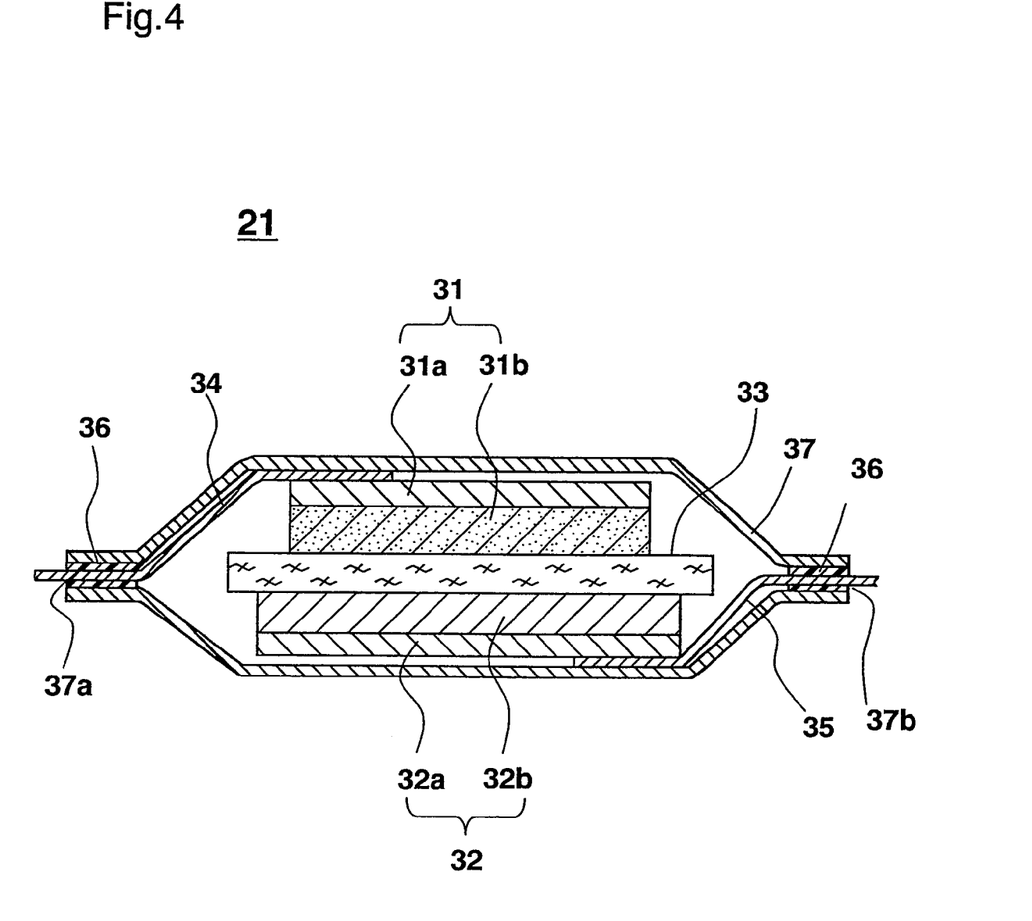
FIG. 4 is a vertical cross sectional view schematically illustrating a configuration of a lithium ion secondary battery of the present invention.
Figure 5:
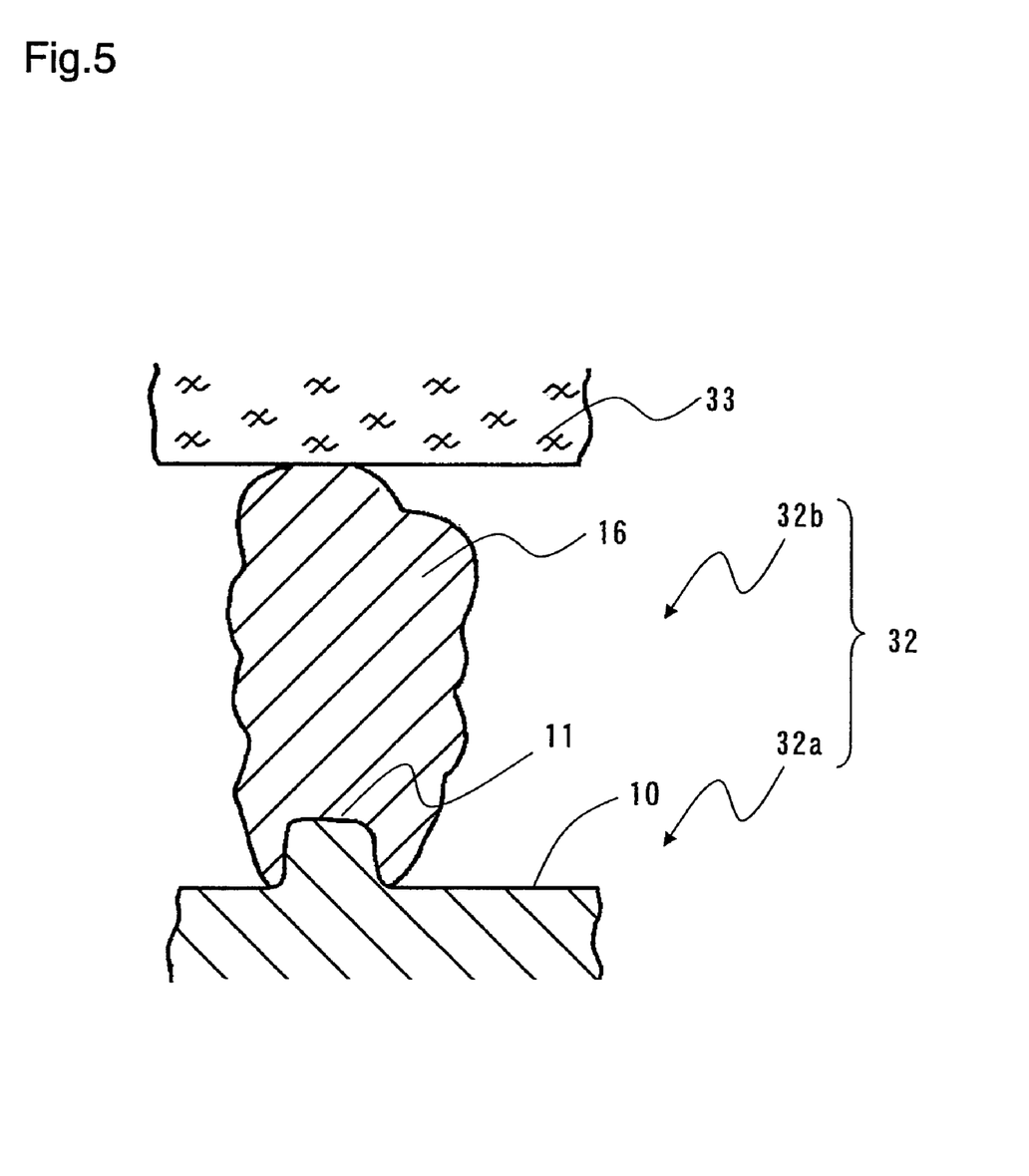
FIG. 5 is an enlarged vertical cross sectional view illustrating a configuration of the main part of the lithium ion secondary battery illustrated in FIG. 4.

FIG. 4 is a vertical cross sectional view schematically illustrating a configuration of a non-aqueous electrolyte secondary battery 21 in another embodiment of the present invention. FIG. 5 is an enlarged vertical cross sectional view illustrating a configuration of the main part of the lithium ion secondary battery illustrated in FIG. 4. The non-aqueous electrolyte secondary battery 21 is a lithium ion secondary battery including a positive electrode 31, a negative electrode 32, a separator 33, a positive electrode lead 34, a negative electrode lead 35, a gasket 36, and an outer case 37.

The positive electrode 31 includes a positive electrode current collector 31a and a positive electrode active material layer 31b. For the positive electrode current collector 31a, those regularly used in the art may be used, including for example, a porous or non-porous conductive substrate. The conductive substrate can be made, for example, of metal materials such as stainless steel, titanium, aluminum, aluminum alloys, and nickel, and conductive resins. The form of the positive electrode current collector 31a is not particularly limited. For example, a plate-like form such as sheet and film is preferable. When the positive electrode current collector 31a is a plate, the thickness is preferably 1 to 50 μm, and further preferably 5 to 20 μm, without limitation.

As shown in FIG. 4, the positive electrode active material layer 31b may be provided on one side of the positive electrode current collector 31a, or may be provided on both sides of the positive electrode current collector 31a. The positive electrode active material layer 31b contains a positive electrode active material, and may further contain for example a conductive agent and a binder as necessary. The positive electrode active material, the conductive agent, and the binder are the same as the positive electrode active material, the conductive agent, and the binder for lithium ion secondary batteries as described in the section of the electrode of the present invention. The positive electrode active material layer 31b can be formed in the same manner as the forming method for positive electrode active material layer of the lithium ion secondary battery as described in the section of the electrode of the present invention.

The negative electrode 32 is the electrode of the present invention, and includes a current collector 32a and a negative electrode active material layer 32b. The negative electrode 32 is provided such that the negative electrode active material layer 32b faces the positive electrode active material layer 31b of the positive electrode 31, with the separator 33 interposed therebetween. The current collector 32a has the same configuration as that of the current collector 1. The negative electrode active material layer 32b has the same configuration as that of the negative electrode active material layer 16.

The separator 33 is provided between the positive electrode 31 and the negative electrode 32. For the separator 33, a sheet or film with predetermined ion permeability, mechanical strength, and nonconductivity is used. Specific examples of the separator 33 include a porous sheet or film such as a microporous film, woven fabric, and nonwoven fabric. The microporous film may be any of a single-layer film and a multi-layer film (composite film). The single-layer film is made of one type of material. The multi-layer film (composite film) is a stack of single-layer films made of one type of material, or a stack of single-layer films made of different materials. The separator 33 may be formed by stacking two or more layers of for example a microporous film, woven fabric, and nonwoven fabric, as necessary.

The separator 33 is made from various resin materials. Among the resin materials, in view of durability, shutdown function, and battery safety, polyolefins such as polyethylene and polypropylene are preferable. The shutdown function is a function of shutting down the battery reaction, by closing the through holes at the time of abnormal heat generation in a battery to curb ion permeation.

The thickness of the separator 33 is generally 10 to 300 μm, preferably 10 to 40 μm, further preferably 10 to 30 μm, and still further preferably 10 to 25 μm. The porosity of the separator 33 is preferably 30 to 70%, and further preferably 35 to 60%. The porosity refers to the ratio of the total volume of the micropores present in the separator 33 relative to the volume of the separator 33.

The separator 33 is impregnated with an electrolyte with lithium ion conductivity. For such an electrolyte, a non-aqueous electrolyte with lithium ion conductivity is preferable. The non-aqueous electrolyte includes, for example, liquid non-aqueous electrolytes, gelled non-aqueous electrolytes, and solid electrolytes (for example, polymer solid electrolyte).

The liquid non-aqueous electrolyte contains a solute (supporting salt) and a non-aqueous solvent, and further contains various additives, as necessary. The solute is generally dissolved in a non-aqueous solvent. For example, the separator is impregnated with the liquid non-aqueous electrolyte.

For the solute, those regularly used in the art may be used, including for example, $LiClO_4$, $LiBF_4$, $LiPF_6$, $LiAlCl_4$, $LiSbF_6$, LiSCN, $LiCF_3SO_3$, $LiCF_3CO_3$, $LiAsF_6$, $LiB_{10}Cl_{10}$, lithium lower aliphatic carboxylate, LiCl, LiBr, LiI, $LiBCl_4$, borates, and imide salts.

Examples of the borates include bis(1,2-benzenedioleate (2-)—O,O') lithium borate, bis(2,3-naphthalenedioleate (2-)—O,O') lithium borate, bis(2,2'-biphenyldioleate(2-)—O,O') lithium borate, and bis(5-fluoro-2-oleate-1-benzenesulfonic acid-O,O') lithium borate. Examples of the imide salts include lithium bistrifluoromethanesulfonate imide (($CF_3SO_2)_2NLi$), lithium trifluoromethanesulfonate nonafluorobutanesulfonate imide (($CF_3SO_2)(C_4F_9SO_2$)NLi), and lithium bispentafluoroethanesulfonate imide (($C_2F_5SO_2)_2N_Li$).

One type of solute may be used singly, or two or more types of solute may be used in combination as necessary. The amount of the solute to be dissolved in the non-aqueous solvent is preferably in the range of 0.5 to 2 mol/L.

For the non-aqueous solvent, those regularly used in the art may be used, including for example, cyclic carbonate, chain carbonate, and cyclic carboxylate. Examples of the cyclic carbonate include propylene carbonate (PC) and ethylene carbonate (EC). Examples of the chain carbonate include diethyl carbonate (DEC), ethyl methyl carbonate (EMC), and dimethyl carbonate (DMC). Examples of the cyclic carboxylate include γ-butyrolactone (GBL) and γ-valerolactone (GVL). One type of non-aqueous solvent may be used singly, or two or more types of non-aqueous solvents may be used in combination as necessary.

Examples of the additive include a material for improving charge and discharge efficiency, and a material for inactivating a battery. For example, the material for improving charge and discharge efficiency decomposes on the negative electrode and forms a coating with a high lithium ion conductivity to improve charge and discharge efficiency. Specific examples of such a material include vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinylethylene carbonate (VEC), and divinylethylene carbonate. These may be used singly, or may be used in combination of two or more. Among these, at least one selected from the group consisting of vinylene carbonate, vinylethylene carbonate, and divinylethylene carbonate is preferable. In the above compounds, a portion of the hydrogen atoms may be replaced with a fluorine atom.

For example, the material for inactivating a battery decomposes at the time of battery overcharge and forms a coating on the electrode surface to inactivate the battery. Examples of such a material include benzene derivatives. Examples of the benzene derivatives include a benzene compound including a phenyl group and a cyclic compound group adjacent to the phenyl group. For the cyclic compound group, for example, the phenyl group, a cyclic ether group, a cyclic ester group, a cycloalkyl group, and a phenoxy group are preferable. Specific examples of the benzene derivative include cyclohexylbenzene, biphenyl, and diphenylether. The benzene derivative may be used singly, or may be used in combination of two or more. However, the benzene derivative content in the liquid non-aqueous electrolyte is preferably 10 parts by volume or less relative to 100 parts by volume of the non-aqueous solvent.

The gelled non-aqueous electrolyte includes a liquid non-aqueous electrolyte and a polymer material for retaining the liquid non-aqueous electrolyte. The polymer material used here is capable of gelling liquid. For the polymer material, those regularly used in the art may be used, including for example, polyvinylidene fluoride, polyacrylonitrile, polyethyleneoxide, polyvinyl chloride, and polyacrylate.

The solid electrolyte includes, for example, a solute (supporting salt) and a polymer material. For the solute, those described as examples in the above may be used. Examples of the polymer material include polyethylene oxide (PEO), polypropylene oxide (PPO), and a copolymer of ethylene oxide and propylene oxide.

Referring to the positive electrode lead 34, one end of the positive electrode lead 34 is connected to the positive electrode current collector 31a, and the other end thereof is brought out of the lithium ion secondary battery 21 from the opening 37a of the outer case 37. Referring to the negative electrode lead 35, one end of the negative electrode lead 35 is connected to the negative electrode current collector 32a, and the other end thereof is brought out of the lithium ion secondary battery 21 from the opening 37b of the outer case 37. For the positive electrode lead 34 and the negative electrode lead 35, any of those regularly used in the field of lithium ion secondary batteries can be used.

The openings 37a and 37b of the outer case 37 are sealed by a gasket 36. For the gasket 36, for example, various resin materials can be used. For the outer case 37, those used regularly in the field of lithium ion secondary batteries can be used. The openings 37a and 37b of the outer case 37 may be directly sealed by welding without using the gasket 36.

The lithium ion secondary battery 21 can be made, for example, as follows. First, one end of the positive electrode lead 34 is connected to the positive electrode current collector 31a of the positive electrode 31, at the face opposite to the face where the positive electrode active material layer 31b is formed. Similarly, one end of the negative electrode lead 35 is connected to the negative electrode current collector 32a of the negative electrode 32 at the face opposite to the face where the negative electrode active material layer 32b is formed.

Then, the positive electrode 31 and the negative electrode 32 are stacked with the separator 33 interposed therebetween, thereby preparing an electrode assembly. At this time, the positive electrode 31 and the negative electrode 32 are disposed so that the positive electrode active material layer 31b and the negative electrode active material layer 32b face each other. This electrode assembly is inserted in the outer case 37, and the other ends of the positive electrode lead 34 and the negative electrode lead 35 are brought out of the outer case 37. Further, an electrolyte is injected in the outer case 37. Under such a state, the openings 37a and 37b are welded with the gaskets 36 interposed therebetween, while decreasing the pressure in the outer case 37 under vacuum. The lithium ion secondary battery 21 is thus obtained.

A lithium ion secondary battery of the present invention can be used for similar application to conventional lithium ion secondary batteries, and is particularly useful for a power source of portable electronic devices such as personal computers, mobile phones, mobile devices, personal data assistants (PDA), camcorders, and mobile game devices. The lithium ion secondary battery of the present invention can be expected to be used for a secondary battery for supporting the driving of electro motors in hybrid electric vehicles, electric vehicles and fuel cell automobiles; a power source for driving an electrically-powered tool, cleaner, and robot; and also for a power source for plug-in HEV.

The present invention is described in detail with reference to examples and comparative examples in the following.

Example 1

A lithium ion secondary battery having the same configuration as that of the lithium ion secondary battery 21 shown in FIG. 1 was made as follows.

(1) Positive Electrode Preparation

A positive electrode material mixture paste was prepared by sufficiently mixing 10g of lithium cobaltate ($LiCoO_2$, positive electrode active material) powder with an average particle size of about 10 μm; 0.3 g of acetylene black (conductive agent); 0.8 g of polyvinylidene fluoride powder (binder); and 5 ml of N-methyl-2-pyrrolidone (NMP). This positive electrode material mixture paste was applied on one side of aluminum foil (positive electrode current collector) with a thickness of 20 μm, dried, and rolled, to form a positive electrode active material layer. Afterwards, the positive electrode was cut out to give a shape of a square with a side of 30 mm. In the obtained positive electrode, the positive electrode active material layer carried on one side of the aluminum foil had a thickness of 70 μm, and a size of 30 mm×30 mm. A positive electrode lead was connected to the aluminum foil on a side opposite to the side where the positive electrode active material layer was formed.

(2) Negative Electrode Preparation

A ceramic layer with a thickness of 100 μm was formed by thermal spraying chromic oxide on the surface of an iron-made roll with a diameter of 50 mm. Two types of holes were formed on the surface of the ceramic layer by laser processing. The first one is first recess portions for forming projections, and the other one is second recess portions for forming minute projections. The first recess portions are circular recess portions with a diameter of 12 μm and a depth of 3 μm.

The first recess portions are disposed in a close-packing arrangement, with a distance between the axes of adjacent first recess portions of 20 μm. The bottom of the first recess portion is substantially flat at its center, and a portion connecting the periphery of the bottom with the side face is formed so as to be rounded off. The first recess portions were formed so that the length from the ceramic layer surface to the center of the bottom of the first recess portion was 3 μm, the center of the bottom is deeper than the periphery of the bottom, and the difference between the depth at the center of the bottom and the depth at the periphery of the bottom was 1 μm or less.

At the bottom of the first recess portion, a third recess portion, i.e., a hole for forming a bump, was formed. The third recess portion was formed so that the axis thereof coincided with the axis of the first recess portion. The third recess portion is a circular recess portion with a diameter of 8 μm and a depth of 5 μm.

On the other hand, the second recess portion is a circular recess portion with a diameter of 12 μm and a depth of 1 μm. The second recess portions were also disposed in a close-packing arrangement as in the case of the first recess portions, and twelve second recess portions were formed. The twelve second recess portions were disposed to be adjacent to each other to provide a chipped portion. The number of the chipped portions per $cm^2$ was 50. A projection-forming roll was thus made.

Alloy copper foil (product name: HCL-02Z, thickness 20 μm, manufactured by Hitachi Cable) containing 0.03 wt % zirconia relative to the total amount was heated in an argon gas atmosphere at 600° C. for 30 minutes for annealing. This alloy copper foil was allowed to pass through a press-contact portion where the two projection-forming rolls were brought into press-contact with each other while applying a line pressure of 2 t/cm to pressure-mold the both sides of the alloy copper foil, thereby making a current collector of the present invention.

As a result of observing a cross section of the obtained current collector in the thickness direction thereof by a scanning electron microscope, it was found that projections with bumps were formed on the current collector surface. The average height, obtained by measuring the heights of 100 projections of the projections, was 7 μm. On the other hand, the heights of the minute projections were in the range of 0.8 to 1 μm, and the ratio of the height of the minute projections relative to the average height of the projections were 11 to 14%. This current collector was cut to give a size of 40 mm×40 mm, forming a negative electrode active material layer.

For forming the negative electrode active material layer, a commercially available deposition apparatus (manufactured by ULVAC, Inc.) having the same structure as that of the electron beam deposition apparatus 50 shown in FIG. 3 was used. Conditions for deposition were as shown below. The fixing board on which the current collector with a size of 40 mm×40 mm was fixed was set so as to rotate between the position shown by the solid line and the position shown by the dot-dash line in FIG. 3. The angle α in FIG. 3 was, in this example, 60°. In this way, a negative electrode active material layer including the column in which the columnar chunks were stacked in eight layers as shown in FIG. 2 was formed. The column was grown in the direction where the projection extends, from the top portion and the side face in the proximity of the top portion of the projection.

(Conditions for Deposition)

Negative Electrode Active Material Raw Material (Evaporation Source): silicon, 99.9999% purity, manufactured by Kojundo Chemical Laboratory Co., Ltd., Japan.

Oxygen Released from Nozzle: 99.7% purity, manufactured by Nippon Sanso Corporation.

Flow Rate of Oxygen Released from Nozzle: 80 sccm

Angle α: 60°

Accelerating Voltage of Electron Beam: −8 kV

Emission: 500 mA

Deposition Period: 3 minutes

Thickness T of the negative electrode active material layer was 16 μm. The thickness of the negative electrode active material layer was determined by observing a cross section of the negative electrode in the thickness direction thereof with a scanning electron microscope, and calculating the average from the measured length (measured value) from the peak of the projection to the peak of the column for ten columns formed on the projection surface. Also, as a result of determining the oxygen amount included in the negative electrode active material layer by the combustion method, it was clarified that the composition of the compound forming the negative electrode active material layer was $SiO_{0.5}$, and porosity P of the negative electrode active material layer was 50%. Porosity P was calculated by the formula below.

Porosity P=(occupied volume of negative electrode active material layer−theoretical volume of the negative electrode active material layer)×100

[In the formula, the occupied volume of the negative electrode active material layer=thickness T of the negative electrode active material layer (16 μm)×area S of the negative electrode active material layer (31 mm×31 mm=961 mm²). The theoretical volume of the negative electrode active material layer=weight W of the negative electrode active material layer/density D of the negative electrode active material layer.]

The theoretical volume of the negative electrode active material layer is the volume of the negative electrode active material layer when it is assumed that there is no hole. Weight W of the negative electrode active material layer was determined by subtracting the weight of the negative electrode current collector from the weight of the negative electrode. The values of the negative electrode weight, the negative electrode current collector weight, and the negative electrode active material layer area used were values determined when the negative electrode was cut into a size of 31 mm×31 mm in the later process.

Then, lithium metal was deposited on the surface of the negative electrode active material layer. By depositing lithium metal, lithium was supplemented in an amount corresponding to the irreversible capacity stored in the negative electrode active material layer at the time of initial charge and discharge. Lithium metal was deposited under an argon atmosphere, by using a resistance heating deposition apparatus (manufactured by ULVAC, Inc.). Lithium metal was placed in a tantalum boat in the resistance heating deposition apparatus, and the negative electrode was fixed so that the negative electrode active material layer faced the tantalum boat. Then, the deposition was carried out for 10 minutes by passing a current of 50 A to the tantalum boat in the argon atmosphere.

(3) Battery Preparation

A positive electrode, a polyethylene microporous film (separator, product name: Hipore, thickness 20 μm, manufactured by Asahi Kasei Corporation), and a negative electrode were stacked so that the positive electrode active material layer and the negative electrode active material layer faced with each other with the polyethylene microporous film interposed therebetween, thereby making an electrode assembly. The electrode assembly was inserted into an outer case of aluminum laminate sheet along with an electrolyte. For the electrolyte, a non-aqueous electrolyte in which $LiPF_6$ was dissolved in a mixed solvent of a 1:1 volume ratio of ethylene carbonate (EC) and ethylmethyl carbonate (EMC) at a concentration of 1.0 mol/L was used. Then, a positive electrode lead and a negative electrode lead were brought out from the openings of the outer case to the outside of the outer case, and while reducing the pressure in the outer case under vacuum, the openings of the outer case were welded, thereby making a lithium ion secondary battery of the present invention.

COMPARATIVE EXAMPLE 1

The same operation as in Example 1 was carried out, except that the projection-forming roll was changed to the one described below.

First, a ceramic layer of chromic oxide was formed on the surface of the iron-made roll in the same manner as Example 1. On the surface of this ceramic layer, only the first recess portions of circular recess portions with a diameter of 12 μm and a depth of 3 μm were formed by laser processing, and the second recess portions were not formed. The first recess portions were disposed in a close-packing arrangement, setting the distance between the axes of adjacent first recess portions to 20 μm.

The first recess portion was processed so that the bottom of the first recess portion had the same form as in the first recess portions in Example 1, and the distance between the ceramic layer surface to the center of the bottom of the first recess portion was 3 μm. A projection-forming roll was thus made. Alloy copper foil (HCL-02Z) was allowed to pass through the press-contact portion where the two projection-forming rolls were brought into press-contact with each other while applying a line pressure of 2 t/cm to pressure-mold the both sides of the alloy copper foil, thereby making a current collector of a comparative example. For the alloy copper foil, alloy copper foil annealed in the same manner as Example 1 was used.

On the surface of the obtained current collector, projections with a diameter of 12 μm were formed. As a result of observing a cross section of the obtained current collector in the thickness direction thereof with a scanning electron microscope in the same manner as Example 1, it was found that the average height of the projection was 7 μm. Then, the same operation as in Example 1 was carried out, thereby making a lithium ion secondary battery.

The lithium ion secondary batteries obtained in Example 1 and Comparative Example 1 were evaluated for charge and discharge cycle characteristics as follows. The results are shown in Table 1.

[Charge and Discharge Cycle Characteristics]

The lithium ion secondary batteries of Example 1 and Comparative Example 1 were placed in a constant temperature bath of 20° C., and the following charge and discharge cycle was carried out for 300 cycles: a constant current charge, a constant voltage charge, a pause of 20 minutes, and a discharge. The ratio of the total discharge capacity at the 300th cycle to the total discharge capacity at the initial cycle was determined by percentage, and this was regarded as a cycle capacity retention rate.

Constant Current Charge: charged at a constant current of 1 C rate (1 C is a current value by which the total battery capacity can be used up in an hour) until the battery voltage reached 4.2 V.

Constant Voltage Charge: charged at a constant voltage until the current value reached 0.05 C.

Discharge: discharged until the battery voltage reached 2.5 V.

Also, the negative electrode was visually checked after 300 cycles to see if there were "detachment" or "wrinkles". "Detachment" is a detachment of the negative electrode active material layer from the current collector. "Wrinkles" are wrinkles formed on the negative electrode face. The occurrence of "wrinkles" means the deformation of the negative electrode. The evaluation results are shown in Table 1, "as electrode plate condition after cycles".

Because the irreversible capacity is supplemented by depositing lithium to the negative electrode in any of the lithium ion secondary batteries, the batteries are designed in a way that the battery capacity is regulated by the positive electrode capacity. That is, when the battery voltage is 2.5 V, i.e., discharge termination voltage, the positive electrode potential based on lithium is 3 V and the negative electrode potential based on lithium is 0.5 V, and the discharge is terminated by the drop of positive electrode potential.

TABLE 1

| Lithium ion Secondary Battery | Charge and Discharge Cycle Capacity Retention Rate | Electrode Plate Conditions after Cycles |
|---|---|---|
| Example 1 | 80% | No Detachment • Wrinkles |
| Comparative Example 1 | 49% | Detachment • Wrinkles Occurred |

In the battery of Example 1, the chipped portion on the current collector surface eases the stress generated by the expansion and contraction of the negative electrode active material. Therefore, the spread of the detachment of the columns formed on the projection surface was curbed, and the detachment of the negative electrode active material layer were kept to the minimum. This significantly improved the cycle capacity retention rate and hence the charge and discharge cycle characteristics, and further curved occurrence of the negative electrode deformation.

The space surrounding the columns is preferably set so that the space has a volume that is about the same as, or slightly larger than the volume of the expanded column. In this way, especially the stress generated at the time of the expansion of the negative electrode active material can be released. Even when the volume of the space is about the same as, or slightly larger than the volume of the negative electrode active material when expanded, if this space is unevenly distributed locally or is a space enclosed by the columns, the stress at the time of the expansion of the negative electrode active material cannot be released, failing to curb the negative electrode deformation.

On the other hand, since there is no chipped portion in the battery of Comparative Example 1, the negative electrode active material expanded to generate distortion in the negative electrode active material layer. As a result, stress is generated at the interface between the negative electrode active material layer and the projections, and this stress causes the detachment of the negative electrode active material layer, which spreads the detachment to almost the entire area at the interface between the negative electrode active material layer and the projections. Thus, with repetitive charge and discharge cycles, the cycle capacity retention rate drops suddenly, causing decline in charge and discharge cycle characteristics, along with the negative electrode deformation.

Example 2

Diamond-shaped first recess portions with diagonals of 10 μm×20 μm were formed on the surface of a high-speed steel roll (manufactured by Hitachi Metals, Ltd.) by laser processing. The first recess portions were disposed in a staggered arrangement, with a distance between their adjacent axes of 20 μm by the side of a major axis, and a distance between their adjacent axes of 18 μm by the side of a minor axis. The bottom of the first recess portion has the same shape as that of the first recess portion of Example 1, and was processed so that the distance from the roll layer surface to the center of the bottom of the first recess portion was 10 μm.

Then, second recess portions, i.e., holes for forming minute projections, were formed. The second recess portions had the same shape as that of the first recess portions, and formed so that the distance from the roll surface to the center of the bottom of the second recess portion was 1 μm. Eighty second recess portions were formed in series and arranged in the same manner as the first recess portions. An aggregate of 80 second recess portions was formed per cm$^2$ of the roll surface. The projection-forming roll was thus made.

A current collector was made by allowing copper foil (manufactured by Furukara Circuit Foil Co., Ltd.) to pass through a press-contact portion where two projection-forming rolls were brought into press-contact with each other while applying a line pressure of 2 t/cm to pressure-mold the both sides of copper foil. The copper foil was annealed and the both sides thereof were treated with surface-roughing plating before use. On the obtained current collector surface, diamond-shaped projections and a chipped portion, i.e., an aggregate of 80 diamond-shaped minute projections, were formed.

As a result of observing a cross section of the obtained current collector in the thickness direction thereof with a scanning electron microscope in the same manner as Example 1, it was found that the average height of the projections was 7 μm. Then, the same operation as in Example 1 was carried out, to make a lithium ion secondary battery of the present invention.

Example 3

A current collector was made in the same manner as Example 2, except that the number of the second recess portions in the aggregate of the second recess portions was changed from 80 to 10, and 100 aggregates of the second recess portions were formed per cm² of the roll surface. Then, the same operation as in Example 1 was carried out, to make a lithium ion secondary battery of the present invention.

Example 4

A current collector was made in the same manner as Example 2, except that the number of the second recess portions in the aggregate of the second recess portions was changed from 80 to 10, and 1000 aggregates of the second recess portions were formed per cm² of the roll surface. Then, the same operation as in Example 1 was carried out, to make a lithium ion secondary battery of the present invention.

Example 5

A current collector was made in the same manner as Example 2, except that the number of the second recess portions in the aggregate of the second recess portions was changed from 80 to 10, and 2000 aggregates of the second recess portions were formed per cm² of the roll surface. Then, the same operation as in Example 1 was carried out, to make a lithium ion secondary battery of the present invention.

In Examples 2 to 5, the ratio of the height of the minute projections to the average height of the projections was 11 to 14%. Cycle performance was evaluated for the lithium ion secondary batteries obtained in Examples 2 to 5 in the same manner as Example 1. The results are shown in Table 2.

TABLE 2

| Example | Charge and Discharge Cycle Capacity Retention Rate | Electrode Plate Conditions after Cycles |
|---|---|---|
| 2 | 70% | No Detachment • Wrinkles |
| 3 | 81% | No Detachment • Wrinkles |
| 4 | 72% | No Detachment • Wrinkles |
| 5 | 61% | Detachment • Wrinkles Occurred |

Table 2 shows that a battery with excellent charge and discharge cycle characteristics can be obtained when the number of the chipped portions per cm² was 1000 or less. In Example 5, due to the large number of chipped portions, the bonding strength between the current collector and the negative electrode active material layer was insufficient from immediately after the formation of the negative electrode active material layer, causing detachment of the active material and a slight decline in charge and discharge cycle characteristics. In Example 2, although the number of the chipped portion per cm² was one, generation of detachment and wrinkles was curbed. This shows that a large number of the minute projections in the chipped portion is effective in easing the stress.

Example 6

Diamond-shaped first recess portions (holes for forming projections) with diagonals of 10 μm×20 μm were formed on the surface of a forged steel roll (manufactured by Fuji Die Co., Ltd.) by laser processing. The first recess portions were disposed in a staggered arrangement, with a distance between their adjacent axes of 20 μm by the side of a major axis, and a distance between their adjacent axes of 18 μm by the side of a minor axis. The bottom of the first recess portion had the same shape as that of the first recess portion of Example 1, and the distance from the roll surface to the center of the bottom of the first recess portion was set to 10 μm.

Then, two second recess portions (holes for forming minute projections) were formed successively. The second recess portion had the same shape as that of the first recess portion, and the distance from the roll surface to the center of the bottom of the second recess portion was set to 1 μm. Five hundred aggregates of the second recess portions were formed per cm² of the roll surface, the aggregate including two second recess portions, thereby making a projection-forming roll.

A current collector was made by allowing zirconia copper foil (manufactured by Hitachi Cable, Ltd.) to pass through a press-contact portion where two projection-forming rolls were brought into press-contact with each other while applying a line pressure of 2 t/cm to press-mold the both sides of the zirconia copper foil. The zirconia copper foil was annealed before use. On the obtained current collector surface, diamond-shape projections, and a chipped portion, i.e., the aggregate of the minute projections, were formed. As a result of observing a cross section of the obtained current collector in the thickness direction thereof with a scanning electron microscope in the same manner as Example 1, it was found that the average height of the diamond-shape projections was 7 μm.

Then, the current collector was immersed in an aqueous solution of copper sulfate including 250 g/liter of copper sulfate pentahydrate and 100 g/liter of sulfuric acid, and the first plating was carried out at a current density of 30 A/dm² and a solution temperature of 50° C. Then, the current collector was immersed in an aqueous solution of copper sulfate including 250 g/liter of copper sulfate pentahydrate and 100 g/liter of sulfuric acid, and the second plating was carried out at a current density of 3 A/dm², and a solution temperature of 50° C. In this way, on the upper side the diamond-shaped projections, surface-roughing treatment was carried out to give a surface roughness of Ra=1 μm. Then, the same operation as in Example 1 was carried out, to make a lithium ion secondary battery of the present invention.

Example 7

A current collector was made in the same manner as Example 6, except that the number of the second recess portions in the aggregate of the second recess portions was changed from 2 to 50, and 500 aggregates of the second recess portions were formed per cm² of the roll surface. Then, the same operation as in Example 1 was carried out, to make a lithium ion secondary battery of the present invention.

Example 8

A current collector was made in the same manner as Example 6, except that the number of the second recess portions in the aggregate of the second recess portions was changed from 2 to 100, and 500 aggregates of the second recess portions were formed per cm² of the roll surface. Then, the same operation as in Example 1 was carried out, to make a lithium ion secondary battery of the present invention.

Example 9

A current collector was made in the same manner as Example 6, except that the number of the second recess portions in the aggregate of the second recess portions was changed from 2 to 200, and 500 aggregates of the second recess portions were formed per cm² of the roll surface. Then, the same operation as in Example 1 was carried out, to make a lithium ion secondary battery of the present invention.

In Examples 6 to 9, the ratio of the height of the minute projection to the average height of the projections was 11 to 14%. Cycle performance was evaluated for lithium ion secondary batteries obtained in Examples 6 to 9 in the same manner as Example 1. The results are shown in Table 3.

TABLE 3

| Example | Charge and Discharge Cycle Capacity Retention Rate | Electrode Plate Conditions after Cycles |
|---|---|---|
| 6 | 70% | No detachment • Wrinkles |
| 7 | 79% | No detachment • Wrinkles |
| 8 | 70% | No detachment • Wrinkles |
| 9 | 60% | Detachment • Wrinkles Occurred |

Table 3 shows that charge and discharge cycle characteristics of the batteries are particularly excellent when the number of the minute projections in the chipped portion was 100 or less. In Example 9, the number of the minute projections included in the chipped portion was many, and the area of one chipped portion was large. Thus, the bonding strength between the current collector and the negative electrode active material layer becomes insufficient from immediately after the formation of the negative electrode active material layer, causing the detachment of the active material and a slight decline in cycle performance. The results of Example 6 also show that even the number of the minute projections in the chipped portion was two, with a many number of the chipped portions, the detachment and wrinkles were curbed, and therefore it is effective for easing stress.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A current collector comprising a substrate comprising a metal sheet,
    wherein said substrate has a first portion and a plurality of second portions on at least one face of said substrate,
    said second portions are distributed on said substrate,
    said first portion is the portion of said substrate excluding said second portions,
    said first portion has a plurality of projections,
    an average height of said projections is 3 to 10 μm,
    each of said projections has a cross-sectional diameter of 1 to 50 μm in a direction parallel to said substrate,
    a number of said projections is 10,000 to 10,000,000 per cm² of the face of said substrate on which said first and second portions are formed,
    each of said second portions has 2 to 100 adjacent minute projections,
    said minute projections have a height that is below 35% of the average height of said projections, and
    a number of said second portions is 5 to 1000 per cm² of the face of said substrate on which said first and second portions are formed wherein the tip said plurality of projections is substantially flat.

2. The current collector in accordance with claim 1, wherein a shape of said plurality of projections viewed from above along the vertical direction is polygon, circle, diamond or oval.

3. The current collector in accordance with claim 1, wherein one or more bumps are provided on a surface of said plurality of projections.

4. An electrode comprising the current collector in accordance with claim 1, and an electrode active material layer containing an electrode active material.

5. The electrode in accordance with claim 4, wherein said electrode active material layer includes a plurality of columns, and said plurality of columns are provided so as to extend from the surface of said plurality of projections to the outside of said plurality of projections, and to be separated from each other.

6. The electrode in accordance with claim 5, wherein said columns comprise a stack of chunks containing said electrode active material.

7. The electrode in accordance with claim 5, wherein a direction to which said columns extend is a direction perpendicular to a surface of said current collector, or a direction that forms an angle with the direction perpendicular to the surface of said current collector.

8. The electrode in accordance with claim 4, wherein said electrode active material expands and contracts due to charge and discharge.

9. The electrode in accordance with claim 8, wherein said electrode active material that expands and contracts due to charge and discharge is at least one negative electrode active material selected from the group consisting of silicon, a silicon compound, tin, and a tin compound.

10. A non-aqueous electrolyte secondary battery comprising the electrode in accordance with claim 4, a counter electrode having a polarity different from said electrode, a separator, and a non-aqueous electrolyte.

11. The non-aqueous electrolyte secondary battery in accordance with claim 10, wherein said non-aqueous electrolyte secondary battery is a lithium ion secondary battery.

* * * * *